(12) United States Patent
Yin et al.

(10) Patent No.: US 7,875,217 B2
(45) Date of Patent: Jan. 25, 2011

(54) EXCESS POLYMER RING REMOVAL DURING OPHTHALMIC LENS MANUFACTURE

(75) Inventors: Changhong Yin, St. Augustine, FL (US); Scott F. Ansell, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 910 days.

(21) Appl. No.: 11/672,308

(22) Filed: Feb. 7, 2007

(65) Prior Publication Data

US 2008/0079184 A1    Apr. 3, 2008

Related U.S. Application Data

(60) Provisional application No. 60/827,527, filed on Sep. 29, 2006.

(51) Int. Cl.
    *B29D 11/00*    (2006.01)
(52) U.S. Cl. ...................... 264/1.36; 264/1.38; 264/2.5; 425/808

(58) Field of Classification Search .................. 264/1.1, 264/1.36, 1.38, 2.5, 402, 484; 425/174, 808, 425/174.8 E
See application file for complete search history.

(56) References Cited

U.S. PATENT DOCUMENTS

| 5,882,698 | A | 3/1999 | Su et al. |
| 5,894,002 | A * | 4/1999 | Boneberger et al. ........ 264/1.36 |
| 6,951,894 | B1 | 10/2005 | Nicohlson et al. |
| 2006/0116437 | A1 | 6/2006 | Turek et al. |

FOREIGN PATENT DOCUMENTS

| EP | 1629960 | 3/2006 |
| FR | 2004171 | 11/1969 |

* cited by examiner

*Primary Examiner*—Mathieu D. Vargot

(57) ABSTRACT

The present invention includes molds for forming ophtalmic lenses, such as contact lens. In particular, the present invention relates to apparatus, molds and methods for fashioning an ophthalmic lens with a mold assembly that includes two or more mold parts with at least one of the mold parts including a flange surface and a static charge differential between each mold part, including the flange surface.

9 Claims, 3 Drawing Sheets

```
┌─────────────────────────────────────────────────────────────┐
│ INJECTION MOLD A FIRST MOLD PART WITH A FIRST FLANGE        │
│ SURFACE AND COMPRISING A FIRST STATIC CHARGE                │
│                                                         200 │
└─────────────────────────────────────────────────────────────┘
                              │
┌─────────────────────────────────────────────────────────────┐
│ INJECTION MOLD A SECOND MOLD PART WITH A SECOND             │
│ FLANGE SURFACE AND COMPRISING A SECOND STATIC CHARGE        │
│                                                         201 │
└─────────────────────────────────────────────────────────────┘
                              │
┌─────────────────────────────────────────────────────────────┐
│ DISCHARGE STATIC CHARGES FROM AT LEAST ONE OF THE           │
│ FIRST AND SECOND MOLD PARTS                             202 │
└─────────────────────────────────────────────────────────────┘
                              │
┌─────────────────────────────────────────────────────────────┐
│ TRANSPORT THE MOLD PARTS                                    │
│                                                         203 │
└─────────────────────────────────────────────────────────────┘
                              │
┌─────────────────────────────────────────────────────────────┐
│ APPLY A STATIC CHARGE DIFFERENTIAL BETWEEN THE FIRST        │
│ FLANGE SURFACE AND THE SECOND FLANGE SURFACE 204            │
└─────────────────────────────────────────────────────────────┘
                              │
┌─────────────────────────────────────────────────────────────┐
│ DEPOSIT A LENS FORMING REACTION MIXTURE INTO THE FIRST      │
│ MOLD PART                                               205 │
└─────────────────────────────────────────────────────────────┘
                              │
┌─────────────────────────────────────────────────────────────┐
│ COMBINE THE FIRST MOLD PART AND THE SECOND MOLD PART        │
│                                                         206 │
└─────────────────────────────────────────────────────────────┘
                              │
┌─────────────────────────────────────────────────────────────┐
│ CURE THE LENS FORMING REACTION MIXTURE IN THE MOLD          │
│ PART TO FORM AN OPHTHALMIC LENS IN A CAVITY FORMED          │
│ BETWEEN THE FIRST MOLD PART AND THE SECOND MOLD PART        │
│                                                         207 │
└─────────────────────────────────────────────────────────────┘
                              │
┌─────────────────────────────────────────────────────────────┐
│ SEPARATE THE MOLD PARTS AND REMOVE ANY EXCESS FLASH         │
│ RING WITH A LENS PART WHICH DOES NOT CONTAIN THE LENS       │
│                                                         208 │
└─────────────────────────────────────────────────────────────┘
                              │
┌─────────────────────────────────────────────────────────────┐
│ AUTOMATICALLY INSPECT LENS MOLD ASSEMBLY AND DETECT         │
│ FEWER EXCESS POLYMER RING DEFECTS THAN THE SAME             │
│ PROCESS WITHOUT THE STATIC CHARGE                       209 │
└─────────────────────────────────────────────────────────────┘
```

FIG. 2

EXCESS POLYMER RING REMOVAL DURING OPHTHALMIC LENS MANUFACTURE

RELATED APPLICATION INFORMATION

This patent application claims priority of a provisional application, U.S. Ser. No. 60/827,527, which was filed on Sep. 29, 2006 the entire disclosure of which is hereby incorporated by reference.

FIELD OF THE INVENTION

This invention relates to molds for forming an ophthalmic lens. More specifically, the present invention relates to apparatus and methods for fashioning an ophthalmic lens with an electrostatic charge differential applied across two or more mold parts resulting in fewer excess polymer ring defects during manufacturing.

BACKGROUND OF THE INVENTION

It is well known that contact lenses can be used to improve vision. Various contact lenses have been commercially produced for many years. Early designs of contact lenses were fashioned from hard materials. Although these lenses are still currently used in some applications, they are not suitable for all patients due to their poor comfort and relatively low permeability to oxygen. Later developments in the field gave rise to soft contact lenses, based upon hydrogels.

Hydrogel contact lenses are very popular today. These lenses are often more comfortable to wear than contact lenses made of hard materials. Soft contact lenses can be manufactured by forming a lens in a multi-part mold where the combined parts form a topography consistent with the desired final lens.

Ophthalmic lenses are often made by cast molding, in which a monomer material is deposited in a cavity defined between optical surfaces of opposing mold parts. Multi-part molds used to fashion hydrogels into a useful article, such as an ophthalmic lens, can include for example, a first mold part with a convex portion that corresponds with a back curve of an ophthalmic lens and a second mold part with a concave portion that corresponds with a front curve of the ophthalmic lens. It is to be understood that unless specifically indicated otherwise, a first mold part can also include front curve mold part wherein the second mold part will therefore comprise a back curve mold part.

To prepare a lens using such mold parts, an uncured hydrogel lens formulation is placed between the concave and convex surfaces of the mold portions and subsequently cured. The hydrogel lens formulation may be cured, for example by exposure to either, or both, heat and light. The cured hydrogel forms a lens according to the dimensions of the mold portions.

Following cure, traditional practice dictates that the mold portions are separated and the lens remains adhered to one of the mold portions. A release process detaches the lens from the remaining mold part.

Further, new developments in the field have led to contact lenses made from hydrogels and silicone hydrogels that are coated with polymers to improve the comfort of the lenses. Often lenses are coated by treating the cured lenses with a polymer. Recently polymer coated lenses have been produced by coating the surfaces of a two part mold with a polymer, adding an uncured formulation to the coated lens mold, curing the lens, and subsequently releasing the cured lens from the mold where the surface of said cured lens is coated with the polymer that was originally adhered to the surface of the mold A particular problem, however, is that the monomer or reaction mixture is supplied in excess to the concave mold piece. Upon mating of the molds, thereby defining the lens, the excess monomer or monomer mixture is expelled from the mold cavity and rests on or between the flange of one or both mold pieces forming an annular ring or flashing around the formed lens.

After separating the two-mold pieces, the peripheral flashing of now polymerized excess material usually remains with the female mold piece, the same piece that holds the lens. In order to further process the lens through hydration, inspection, packaging, sterilization, etc., it is necessary to remove the flashing of polymerized material from the female mold piece. When the flashing remains with the female mold piece with the lens, it is manually picked off with the finger.

Therefore it would be useful to have improved methods and apparatus for removing an ophthalmic lens from the mold in which it is held, and also remove any surrounding flashing from the lens.

SUMMARY OF THE INVENTION

Accordingly, the present invention provides methods and apparatus for separating an ophthalmic lens from a flashing when the mold pieces are separated.

According to the present invention, multiple mold assemblies can be formed, with each mold assembly including a matching set of a first mold part and a second mold part. A static charge differential is imparted between each set of first mold parts and second mold parts and a reaction mixture is dosed into the first mold part. Each second mold part of each set is coupled to each first mold part to form a cavity therebetween. The reaction mixture is thereby formed to a shape of the cavity. The reaction mixture is exposed to actinic radiation thereby forming multiple ophthalmic lenses. The multiple lenses formed are inspected for excess polymer ring defects to determine if less than a threshold incidence of excess ring defects is present in the multiple lenses formed.

Apparatus that may be used to implement various aspects of the present invention, can include, for example, a mold assembly with a surface energy that can be indicative of whether materials will adhere to a surface of the mold. The mold assembly can include a first mold part and a second mold part, wherein each mold part includes a lens forming surface. A lens may be molded between the mold parts by inserting a lens forming material between the lens forming surface of the first mold part and the lens forming surface of the second mold part, and curing the lens forming material. A static charge apparatus is operative to impart a static charge differential between the flange surface of the first mold part and the lens forming surface of the second mold part. The static charge differential between the first mold part and the second mold part can be within a range of about 30 kV.

The present invention improves this portion of a lens making process by reducing cost, increasing throughput and allowing for automation.

DESCRIPTION OF THE DRAWINGS

FIG. 2 illustrates a block diagram of method steps that can be used to implement the present invention.

DETAILED DESCRIPTION OF THE INVENTION

Figure 1:
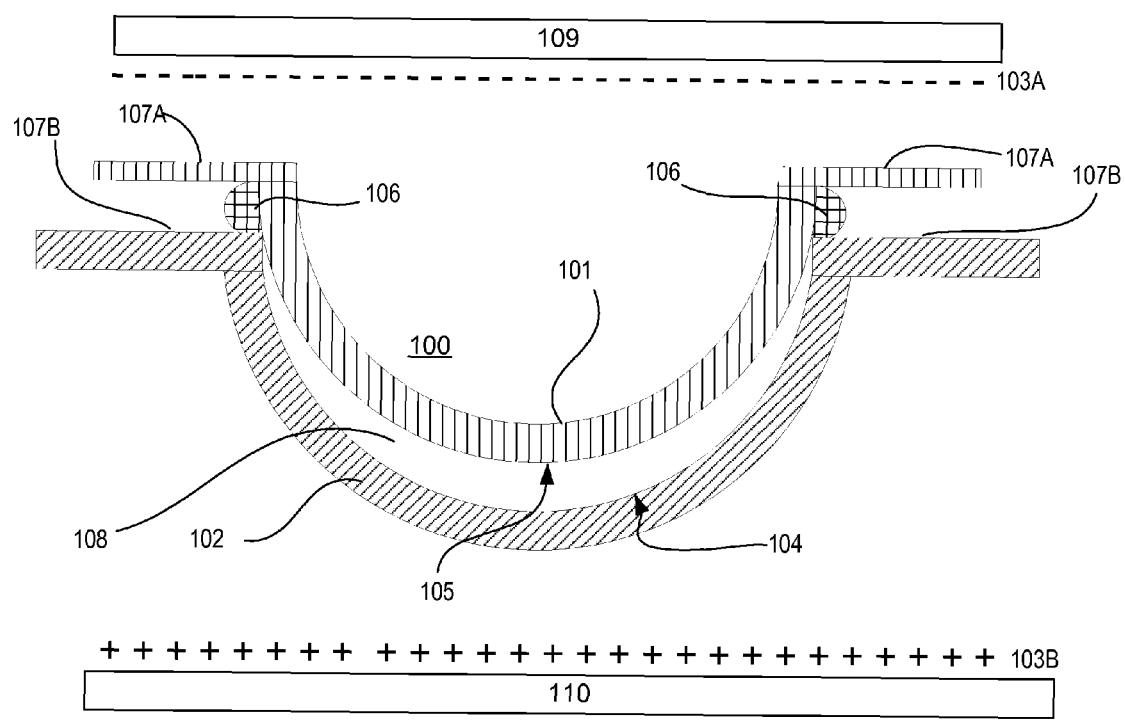
FIG. 1 illustrates a diagram of ophthalmic lens mold parts and lens with static charge bars proximate to the mold parts.

It has been separately described to use a static charge differential between mold parts used to form an ophthalmic lens in order to decrease the incidence of hole defects. However, according to the present invention, use of a positive static charge on a front curve mold piece may have a beneficial effect of decreasing the incidence of hole defects, but also may have an unwanted increase in the incidence of excess polymer ring defects attached to the front curve mold part. Therefore, according to the present invention, a relative positive static charge is applied to a back curve portion of a mold assembly (in relation to the front curve), which provides a beneficial effect of minimizing both hole defects and excess ring defects.

It known that the adhesion of the polymerized monomer material to the mold in which it is formed and polymerized is related to the surface energy of the mold material. Surface energy is referred to here as a material property analogous to the surface tension of a liquid, it determines the wettability of the material and can be measured in dyne per centimeter. The surface energy of a material can be determined by a contact angle measurement. By measuring the contact angle of a liquid droplet on a solid surface using a goniometer, the surface energy can be determined. Generally, under otherwise similar conditions, the smaller the contact angle measured the more wettable the surface.

The present invention relates generally to apparatus and methods for molding ophthalmic lenses via two or more mold parts, wherein a delta in static charge across the mold parts is utilized to generate different surface energy on each mold part In particular, in some embodiments, the present invention refers to the use of two mold parts, such as a base curve mold part and a front curve mold part, wherein a static charge on a flange area of the base curve that is negative relative to the front curve results in much improved removal of excess polymer resulting from a lens making process.

According to the present invention, at least the flange portions of the injection molded parts are treated with static prior to assembly thereby changing the surface characteristics of raw materials used in the plastic mold part formation process. In various embodiments, static charging may be utilized either through absolute charging, which may be positive or negative absolute charging, or by imparting a static differential between two mold parts. In some preferred embodiments, In some embodiments, static charges of plus or minus 30 kV may be applied to achieve reduction in excess polymer ring defects. Some preferred embodiments, such as, for example while using a polypropylene material as a back curve mold part 101, include a preferred range of −1 KvkV to −10 kV. A most preferred range, such as, for example while using polypropylene mold parts, includes a static charge of about + or −0.2 kV to −6 kV differentials between mold parts included in a mold assembly.

Use of static charge differentials across mold parts has reduced excess polymer ring occurrence from an incidence of greater than 30% of lenses with excess polymer ring defects to less than 10% of lenses with excess polymer ring defects. In some embodiments, a static charge differential resulted in excess polymer ring defects of less than 1%.

In another aspect, application of a static differential across a front curve mold part and a back curve mold part enables wetting speeds during deposition of monomer in a mold part.

Various embodiments can include a static charge that is imparted during injection molding through final assembly, with a preferred step in a processing sequence for imparting static charge being located just prior to mold assembly (as described more fully below).

Defined Terms

As used herein, an "excess polymer defect" is a defect in an ophthalmic lens comprising inclusion of excess polymerized monomer attached to a lens.

As used herein, a "hole defect" is a defect in an ophthalmic lens comprising a void of lens material in the surface of the lens.

As used herein "lens" or "ophthalmic lens" refers to any ophthalmic device that resides in or on the eye. These devices can provide optical correction or may be cosmetic. For example, the term lens can refer to a contact lens, intraocular lens, overlay lens, ocular insert, optical insert or other similar device through which vision is corrected or modified, or through which eye physiology is cosmetically enhanced (e.g. iris color) without impeding vision.

As used herein, the term "lens forming mixture" (also sometimes referred to as a "Reaction Mixture") refers to a monomer or prepolymer material which can be cured, to form an ophthalmic lens. Various embodiments can include mixtures with one or more additives such as: UV blockers, tints, photoinitiators or catalysts, and other additives one might desire in an ophthalmic lenses such as, contact or intraocular lenses. Lens forming mixtures are more fully described below.

As used here, the term "mold part" refers to a plastic, rigid or semi-rigid object, that may be used to form lenses from uncured formulations.

As used herein, the term "uncured" refers to the physical state of a reaction mixture (sometimes referred to as "lens formulation") prior to final curing to form a lens. Some reaction mixtures contain mixtures of monomers which are cured only once. Other reaction mixtures contain monomers, partially cured monomers, macromers and other components.

As used herein the term "lens forming surface" means a surface 103-104 that is used to mold a lens. In some embodiments, any such surface 103-104 can have an optical quality surface finish, which indicates that it is sufficiently smooth and formed so that a lens surface fashioned by the polymerization of a lens forming material in contact with the molding surface is optically acceptable. Further, in some embodiments, the lens forming surface 103-104 can have a geometry that is necessary to impart to the lens surface the desired optical characteristics, including without limitation, spherical, aspherical and cylinder power, wave front aberration correction, corneal topography correction and the like as well as any combinations thereof.

Static Charged Molds

In the formation of plastic molds that may be used to form lenses from uncured formulations, the preferred molds include two parts where either the front curve or the back curve part is formed in mold tooling which has been cooled to a temperature ambient to the mold tooling or less, prior to injection of molten material used to fashion the plastic mold part.

Referring now to FIG. 1, a diagram of exemplary mold parts 101-102 and static charging devices 109-110 for use in ophthalmic lens manufacture is illustrated. The mold assembly can include a form 100 having a cavity 105 into which a lens forming mixture can be dispensed such that upon reaction or cure of the lens forming mixture, an ophthalmic lens 108 of a desired shape is produced. The molds and mold assemblies 100 of this invention are made up of two or more "mold parts" or "mold pieces" 101-102.

At least one mold part 101-102 is designed to have at least a portion of its surface 104-105 in contact with the lens forming mixture such that upon reaction or cure of the lens forming mixture that surface 104-105 provides a desired shape and form to the portion of the lens with which it is in contact ("lens forming surface"). The same is true of at least one other mold part 101-102. The portion of the concave surface 104 which makes contact with reaction mixture has the curvature of the front curve of an ophthalmic lens to be produced in the mold assembly 100 and is sufficiently smooth and formed such that the surface of an ophthalmic lens formed by polymerization of the reaction mixture which is in contact with the concave surface 104 is optically acceptable.

Similarly, the back curve mold part 101 has a convex surface 105 in contact which contacts the lens forming mixture and has the curvature of the back curve of an ophthalmic lens to be produced in the mold assembly 100. The convex surface 105 is sufficiently smooth and formed such that the surface of an ophthalmic lens formed by reaction or cure of the lens forming mixture in contact with the back surface 105 is optically acceptable. Accordingly, the inner concave surface 104 of the front curve mold part 102 defines the outer surface of the ophthalmic lens, while the outer convex surface 105 of the back mold piece 101 defines the inner surface of the ophthalmic lens.

The mold parts 101-102 can be brought together, or "coupled", such that a cavity is formed by combination of the mold parts 101-102 and a lens 108 can be fashioned in the cavity 105. This combination of mold parts 101-102 is preferably temporary. Upon formation of the lens, the mold parts 101-102 can again be separated for removal of a fashioned lens. FIG. 1 illustrates a back curve mold part 101 separated from a front curve mold part 102.

According to the present invention, a static charge 103A-103B is imparted to one or both of the front curve mold part 102 and back curve mold part 101, and in particular to a flange area 107A-107B which is proximate to excess polymer 106. The static charge may be imparted, for example via one or more static bars 109-110 placed proximate to the respective one or more mold parts 101-102. In some preferred embodiments, the static bars are positioned proximate to the one or both of the convex lens forming surface 105 and the concave lens forming surface 104. Although the static charges are indicated as 103A "−" or 103B "+", those skilled in the art will understand that these representations are only exemplary and that embodiments may include a differential with a back curve in a positive state relative to a front curve that is accomplished with a voltage delta and not contingent on a positive or negative charge.

According to the present invention, a static charge applied will provide a static charge differential between the flange areas 107A-107B sufficient to cause any excess polymer ring 106 to adhere to a desired mold part 101-102. In some preferred embodiments, a positive charge is applied to a front curve mold part 102 and a negative charge is applied to a back curve mold part 101 which is sufficient to cause excess polymer ring 106 to remain with the back curve mold part 101 following a demold operation. Some preferred embodiments can therefore include a negative charge of between about −1 kV to about −30 kV imparted to a back curve and a positive charge of between about +0 kV to about +10 kV imparted to a corresponding front curve In some preferred embodiments, mold materials can include ExxonMobil PP9544MED® Polypropylene (9544) as base curve and NOVA Chemicals Polystyrene VEREX 1300® compounded with Zinc Stearate additive as front curve.

Alternate materials such as Zeonor and Zeonex by Zeon Chemical Corporation and polypropylene blends at variety of blending ratios can also be used, as can polyolefins, cyclic olefins and cyclic olefin copolymers, including, in some embodiments polyolefins and COCs compounded with additives. In some specific embodiments, examples can include, but are not limited to: PP9544 and polystyrene, 55% Zeonor and 45% polypropylene or polystyrene, 75% Zeonor and 25% polypropylene or polystyrene, 25% Zeonor and 75% polypropylene or polystyrene, 10% Zeonor and 90% polypropylene or polystyrene, 90% Zeonor and 10% polypropylene or polystyrene, 50% Zeonor and 50% polypropylene or polystyrene, and ExxonMobil PP 1654 E with the same above ratios.

These blended resins can be obtained using different compounding methods, including hand blending, single screw compounding, twin screw and/or multiple screw compounding.

Preferred embodiments may also include one or more of: COCs, alicyclic co-polymers and a polypropylene as a primary mold part material. In addition, in some embodiments, the molds of the invention may contain additives that facilitate the separation of the lens forming surfaces, reduce the adhesion of the cured lens to the molding surface, or both. For example, additives such as metal or ammonium salts of stearic acid, amide waxes, polyethylene or polypropylene waxes, organic phosphate esters, glycerol esters or alcohol esters may be added to alicyclic co-polymers prior to curing said polymers to form a mold. Examples of such additives can include, but are not limited, to Dow Siloxane MB50-001 or 321 (a silicone dispersion), Nurcrel 535 & 932 (ethylene-methacrylic acid co-polymer resin Registry No. 25053-53-6), Erucamide (fatty acid amide Registry No. 112-84-5), Oleamide (fatty acid amide Registry No. 301-02-0), Mica (Registry No. 12001-26-2), Atmer 163 (fatty alkyl diethanolamine Registry No. 107043-84-5), Pluronic (polyoxypropylene-polyoxyethylene block co-polymer Registry No. 106392-12-5), Tetronic (alkyoxylated amine 110617-70-4), Flura (Registry No. 7681-49-4), calcium stearate, zinc stearate, Super-Floss anti block (slip/anti blocking agent, Registry No. 61790-53-2), Zeospheres anti-block (slip/anti blocking agent); Ampacet 40604 (fatty acid amide), Kemamide (fatty acid amide), Licowax fatty acid amide, Hypermer B246SF, XNAP, polyethylene glycol monolaurate (anti-stat) epoxidized soy bean oil, talc (hydrated Magnesium silicate), calcium carbonate, behenic acid, pentaerythritol tetrastearate, succinic acid, epolene E43-Wax, methyl cellulose, cocamide (anti-blocking agent Registry No. 61789-19-3), poly vinyl pyrrolidinone (360,000 MW). The preferred additives are polyvinyl pyrrolidinone, zinc stearate and glycerol mono stearate, where a weight percentage of additives based upon the total weight of the polymers is about 0.05 to about 10.0 weight percent, preferably about 0.05 to about 3.0, most preferably about 2.0 weight percent.

In some embodiments, in addition to additives, the separation of the lens from a lens forming surfaces may be facilitated by applying surfactants to the lens forming surfaces. Examples of suitable surfactants include Tween surfactants, particularly Tween 80.

Still further, in some embodiments, the molds of the invention may contain other polymers such as polypropylene, polyethylene, polystyrene, polymethyl methacrylate, modified polyolefins containing an alicyclic moiety in the main chain and cyclic polyolefins, such as, for example Zeonor and EOD 00-11 by Atofina Corporation. For example, a blend of the alicyclic co-polymers and polypropylene (metallocene catalyst process with nucleation, such as ATOFINA EOD 00-11®) may be used, where the ratio by weight percentage of alicyclic co-polymer to polypropylene ranges from about 99:1, to about 20:80 respectively. This blend can be used on either or both mold halves, however, in some embodiments, it is preferred that this blend is used on the back curve and the front curve consists of the alicyclic co-polymers.

In some embodiments, one or both of the first mold part 102 and the second mold part 101 may also include multiple layers, and each layer may have different chemical structures. For example, a front curve mold part 102 may include a surface layer and a core layer, (not illustrated) such that the core layer includes the first material and the second material and is essentially covered by the first layer. At any given cross section, a concentration of the first material present in the surface layer is greater than the concentration of the first material present in the core layer. To continue with the example, according to the present invention, the surface layer and also the core layer are cooled by a mold structure maintained at a temperature less than an ambient temperature.

Method Steps

Referring now to FIG. 2, a flow diagram illustrates exemplary steps that may be implemented in some embodiments of the present invention. It is to be understood that some or all of the following steps may be implemented in various embodiments of the present invention.

At 200, a first mold part with a flange surface and including a first static charge is injection molded.

At 201, a second mold part with a second flange surface and including a second static charge is injection molded.

At 202, a step that may be implemented in some embodiments can include discharging a static charge from one or both of the first mold part and the second mold part.

At 203, one or both of the mold parts may be transported and further processed. Further processing may include, for example, application of a colorant or other modification to one or both of the lens mold parts.

At 204, a static charge can be applied to one or both of the first mold part and the second mold part to create a static charge differential between the first lens mold part and the second lens mold part. The charge can be applied, for example, via a static bar positioned proximate to a mold part, such as for example within 5 mm to a back curve lens forming surface or front curve lens forming surface. Some preferred embodiments can include a static bar within 2 mm from a back curve lens forming surface or front curve lens forming surface. Other embodiments can position a static bar or other static charge inducing device at whatever distance is appropriate for the design of the device and the charge that is to be applied.

At 205, a lens forming mixture is deposited into a mold cavity using well known procedures.

At 206 the first mold part is combined with a second mold part. Deposition of the lens forming mixture and assembly of the first mold part to the second mold part will cause a ring of excess lens forming mixture to form which is in contact with a flange portion of one or both mold parts. At 207 the lens forming mixture is cured to form an ophthalmic lens and also form an excess polymer ring. At 208, the first mold part and the second mold part may be separated, using well known practices in the art. During separation, the excess polymer ring will adhere to a mold part with a negative static charge relative to the corresponding mold part.

At 209, automatic lens inspection (sometimes referred to as, "ALI") equipment can be used to inspect the lens and determined if the lens is defective. According to the present invention, the ALI equipment will determine if an excess polymer ring defect has occurred. The incidence of excess polymer ring defects can thereby be determined and it can additionally be ascertained whether a predetermined incidence, such as, for example, less than 1% or less than 5% or less than 20% has been achieved.

The ALI can include, for example, a camera which feeds images of the lenses and mold parts into a computer. The computer can be operative via executable software to analyze images of the lenses 108 and mold parts 101-102 to determine if an excess polymer ring defect is present in a lens. The computer can also be operative via executable software to determine a level of excess polymer ring defect incidence in a set of multiple lenses formed. In some embodiments the computer can be additionally operative to determine if a level of excess polymer ring defect incidence in a set of multiple lenses formed approaches or exceeds a predetermined threshold amount. A threshold can include, for example a percentage of lenses processed, such as, for example 1%, 10% or 20%.

Apparatus

Figure 3:
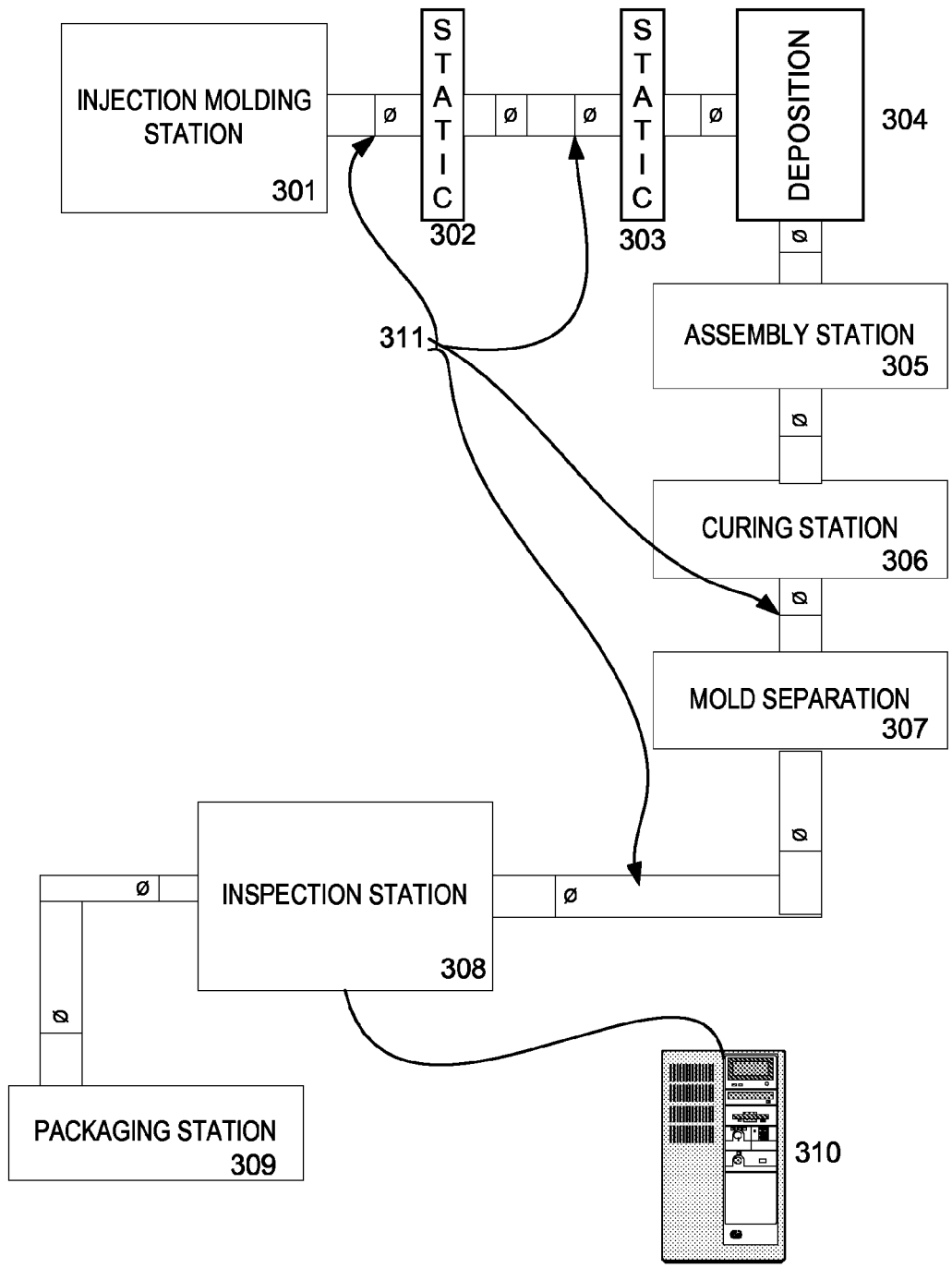
FIG. 3 illustrates a block diagram of apparatus that can be used to implement the present invention.

Referring now to FIG. 3, a block diagram is illustrated of apparatus contained in processing stations 301-304 that can be utilized in implementations of the present invention. In some preferred embodiments, processing stations 301-309 can be accessible to ophthalmic lenses 100 via a transport mechanism 311. The transport mechanism 311 can include for example one or more of: a robot, a conveyor and a rail system in conjunction with a locomotion means that may include, a conveyor belt, chain, cable or hydraulic mechanism powered by a variable speed motor or other known drive mechanism (not shown).

Some embodiments can include back surface mold parts 101 placed in pallets (not shown). The pallets can be moved by the transport mechanism 311 between two or more processing stations 301-309. A computer or other controller 310 can be operatively connected to the processing stations 301-309 to monitor and control processes at each station 301-309 and also monitor and control the transport mechanism 311 to coordinate the movement of lenses between the process stations 301-309.

Processing stations 301-309 can include, for example, an injection molding station 301 used to form a plastic mold part 101-102 in which an ophthalmic lens may be formed. Once formed, in some embodiments, one or more of mold parts 101-102 used to fashion an ophthalmic lens 108 can have a static charge discharged. The plastic mold part may be transported via the transport mechanism 311. A static charge apparatus 303, such as, for example, a static bar can be used to impart a static charge to one or more of mold parts used to fashion the lens and create a static charge differential between the mold parts, and with a positive charge on a mold piece to which any excess polymer ring is to remain adhered.

In some embodiments a charge imparted can create a static charge differential of about 60 kV, which can be realized anywhere in the + or −30 kV range. The static charge can be imparted anywhere from mold formation through final assembly, with a preferred location being immediately prior to a deposition station 304. The deposition station 304 will deposit a Reaction Mixture dose into a mold part and an assembly station 305 can be functional to assemble the two or more mold parts across which a static charge differential has been imparted.

In some embodiments, polymerization of Reaction Mixture can be carried out in an atmosphere with controlled exposure to oxygen, including, in some embodiments, an oxygen-free environment, because oxygen can enter into side reactions which may affect a desired optical quality, as well as the clarity of the polymerized lens.

A curing station 306 can include apparatus for polymerizing the Reaction Mixture. Polymerization is preferably carried out by exposing the Reaction Mixture to a source of initiation which can include for example, one or more of: actinic radiation and heat. Curing station 302 therefore includes apparatus that provide a source of initiation of the Reaction Mixture deposited into a mold part. In some embodiments, actinic radiation can be sourced from bulbs under which the mold assemblies travel. The bulbs can provide an intensity of actinic radiation in a given plane parallel to the axis of the bulb that is sufficient to initiate polymerization.

In some embodiments, a curing station 302 heat source can be effective to raise the temperature of the Reactive Mixture to a temperature sufficient to assist the propagation of the polymerization and to counteract the tendency of the Reaction Mixture to shrink during the period that it is exposed to the actinic radiation and thereby promote improved polymerization. Some embodiments can therefore include a heat source that can maintain the temperature of the Reaction Mixture (by which is meant that resin before it begins to polymerize, and as it is polymerizing) above the glass transition temperature of the polymerized product or above its softening temperature as it is polymerizing. Such temperature can vary with the identity and amount of the components in the Reaction Mixture. In general, some embodiments include apparatus capable of establishing and maintaining temperatures on the order of 40° C. degree to 75° C.

In some embodiments, a source of heat can include a duct, which blows warm gas, such as, for example, $N_2$ or air, across and around the mold assembly as it passes under the actinic radiation bulbs. The end of the duct can be fitted with a plurality of holes through which warm gas passes. Distributing the gas in this way helps achieve uniformity of temperature throughout the area under the housing. Uniform temperatures throughout the regions around the mold assemblies can facilitate more uniform polymerization.

A mold separation station 307 can include apparatus to separate the back curve mold part 101 from the front curve mold part 102. Separation can be accomplished for example with mechanical fingers and high speed robotic movement that pry the mold parts apart.

An automatic lens inspection station 308 can be utilized to determine whether a lens has an excess polymer ring defect. The automatic lens inspection station can include, for example, a camera which feeds images of the lenses and associated mold parts into a computer 306 for analysis. A packaging station 309 can package a lens for distribution.

Lens Materials

In some embodiments, by way of non-limiting example, preferred lenses of the invention are soft contact lenses can be made from silicone elastomers or hydrogels, which include but are not limited to silicone hydrogels, and fluorohydrogels.

Other preferred embodiments of the resent invention can include lenses of etafilcon A, genfilcon A, lenefilcon A, polymacon, acquafilcon A, balafilcon A, lotrafilcon A, galyfilcon A, senofilcon A, silicone hydrogels. Other embodiments can include ophthalmic lenses made from prepolymers. These patents as well as all other patent disclosed in this application are hereby incorporated by reference in their entirety.

While the present invention has been particularly described above and drawings, it will be understood by those skilled in the art that the foregoing ad other changes in form and details may be made therein without departing from the spirit and scope of the invention, which should be limited only by the scope of the appended claims.

What is claimed is:

1. A method of molding an ophthalmic lens, the method comprising the steps of:
    forming multiple mold assemblies, each mold assembly comprising a first mold part and a second mold part and each mold part comprising an optical surface portion;
    imparting a static charge differential between multiple sets of first mold parts and second mold parts, wherein at least the second mold part comprises a flange and the static charge differential comprises a negative charge imparted to the respective second mold parts across a lens forming surface, relative to the first mold part and the static charge is imparted via a static bar;
    dosing a reaction mixture into the first mold parts;
    coupling respective second mold parts to the first mold parts thereby forming a cavity therebetween, with the reaction mixture formed to a shape of the cavity and the reaction mixture also formed into a ring in contact with the flange surface of the second mold parts;
    exposing the reaction mixture to actinic radiation thereby forming an ophthalmic lens in the respective multiple mold assemblies and also forming an excess polymer ring in at least some of the multiple mold assemblies;
    decoupling the second mold part from the first mold part;
    automatically inspecting the multiple ophthalmic lenses formed and corresponding first mold parts for excess polymer ring defects;
    designating an incidence of polymeric ring attachment to one or both of: formed ophthalmic lenses and respective first mold parts containing the formed ophthalmic lens with no static charge applied; and
    determining a decreased incidence of excess polymer rings attached to one or both of: the multiple ophthalmic lenses formed and the corresponding first mold parts with the imparting a static charge differential between each set of first mold parts and second mold parts, as compared to similar mold parts without a static charge differential.

2. The method of claim 1 wherein the static charge differential imparted between the first mold part and the second mold part is of about 30 kV.

3. The method of claim 1 wherein the static charge differential imparted between the first mold part and the second mold part is within a range of about 0.5 kV and 5.0 kV.

4. The method of claim 1 wherein the static charge differential imparted between the first mold part and the second mold part is within a range of about 0.5 kV and 0.05 kV.

5. The method of claim 1 additionally comprising the steps of:
    discharging static charge from at least one of the first mold part and the second mold part; and
    transporting the least one of the first mold and the second mold part from which static has been discharged on a transport apparatus.

6. The method of claim 1 wherein at least one of the first mold part and the second mold part comprises polyvinyl alcohol.

7. The method of claim 1 wherein at least one of the first mold part and the second mold part comprises polypropylene.

8. The method of claim 2 wherein the automatic lens inspection for delamination indicates a less than 1% incidence of ophthalmic excess polymer ring defect.

9. The method of claim 2 wherein the automatic lens inspection for delamination indicates a less than 20% incidence of ophthalmic excess polymer ring defect.

* * * * *